Dec. 13, 1960    F. H. KAYLER ET AL    2,963,990
TRAILER SUPPORT BEAM
Filed Sept. 23, 1955    2 Sheets-Sheet 1
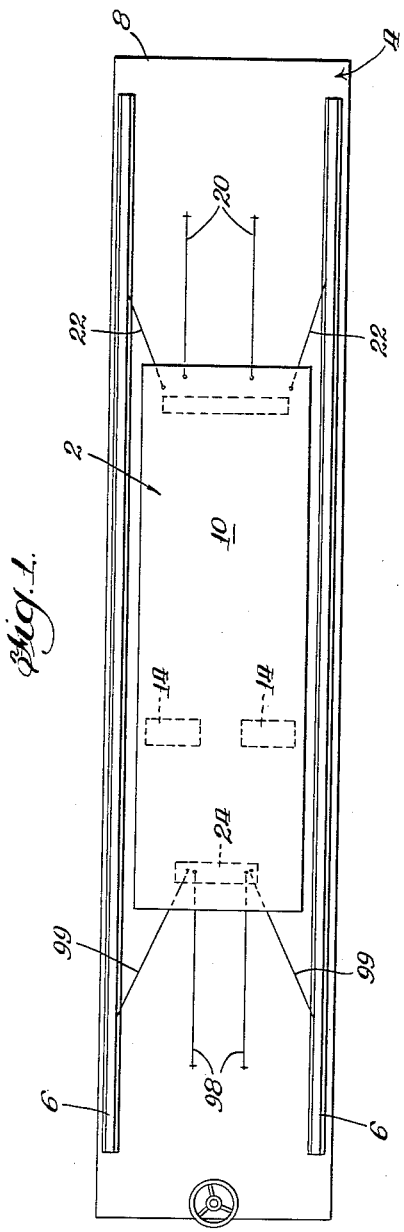
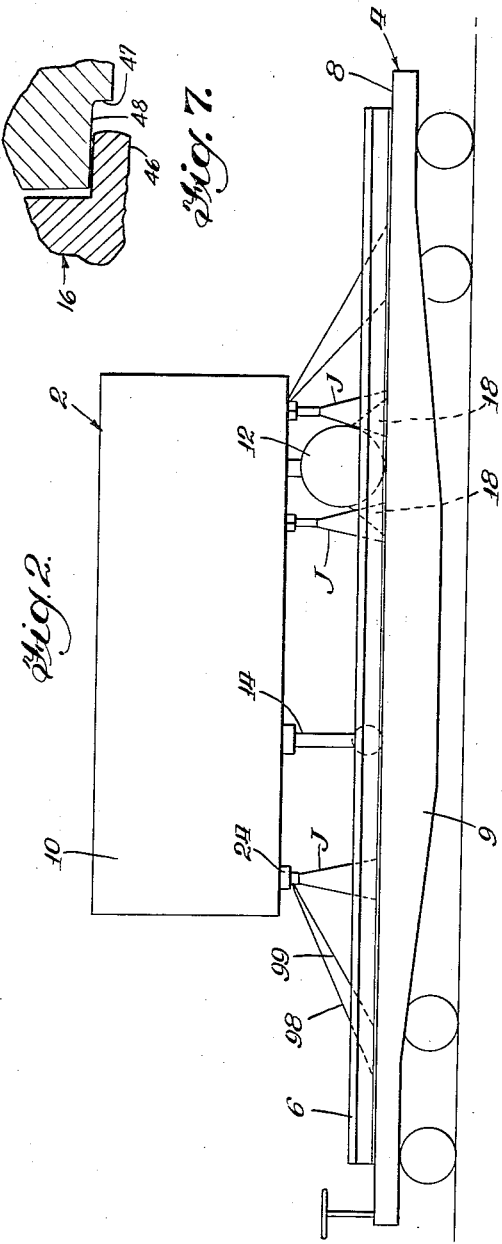
INVENTORS.
Frank H. Kayler
Eugene F. Opsahl
by Walter L. Schlegel, Jr. Atty.
Witness:
Chas H Bartlett Dec. 13, 1960
F. H. KAYLER ET AL
2,963,990
TRAILER SUPPORT BEAM
Filed Sept. 23, 1955
2 Sheets-Sheet 2
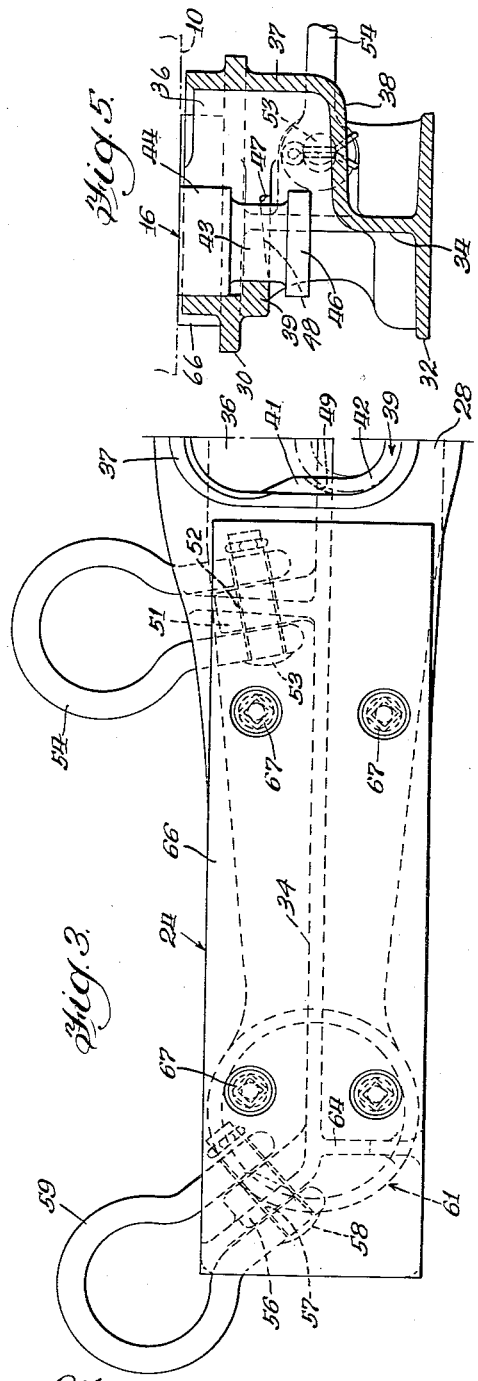
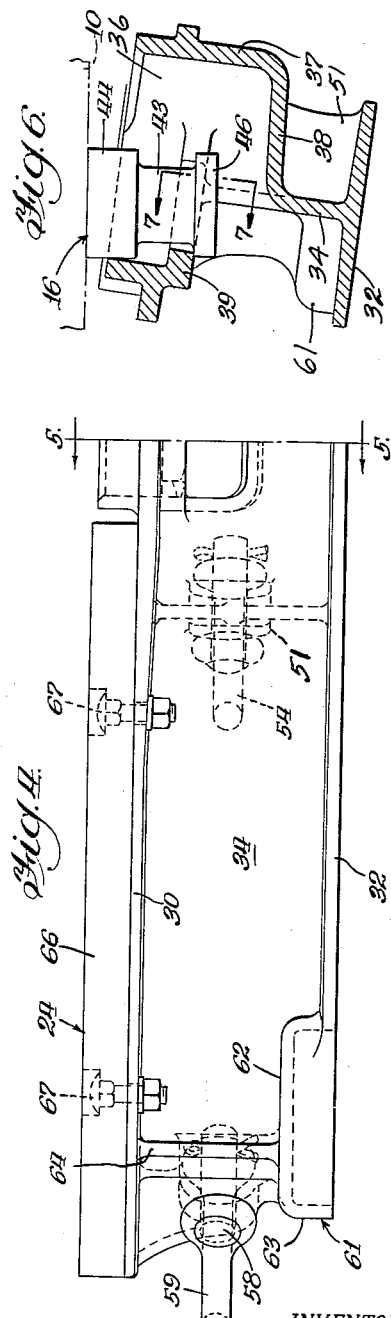
INVENTORS.
Frank H. Kayler
Eugene G. Opsahl
by Walter J. Schlegel, Jr. Atty.

United States Patent Office 2,963,990
Patented Dec. 13, 1960

2,963,990

TRAILER SUPPORT BEAM

Frank H. Kayler, Alliance, Ohio, and Eugene G. Opsahl, Park Forest, Ill., assignors to American Steel Foundries, Chicago, Ill., a corporation of New Jersey Filed Sept. 23, 1955, Ser. No. 536,236

5 Claims. (Cl. 105—368)

This invention relates to railway conveyances for transporting highway trailers from city to city and more particularly to means for detachably securing trailers upon railway conveyances.

Briefly, the present invention contemplates the provision of a railway conveyance such as a flat car to receive and support a highway trailer for intercity movement. To facilitate movement of a trailer onto and off of a flat car, the car is positioned adjacent a loading platform or ramp, and the trailer is adapted to be moved by means of a conventional tractor along said platform or ramp onto or off of the car.

After movement of a trailer onto a car, the tractor is disconnected from the trailer and removed from the car. The rear wheels of the trailer are then engaged between sets of chock blocks secured to the car floor; and the rear end of the trailer body is supported upon jacks. The front end of the trailer body is also supported upon jacks which engage opposite ends of a support beam centrally connected to the trailer king pin. Tie down chains extend forwardly from the support beam to the car floor, and other tie down chains extend rearwardly from the trailer body to the car floor.

An object of the invention is to provide simple means for detachably securing a highway trailer on a railway flat car without the necessity of altering the structure of the trailer in any way, or otherwise specially adapting it for the purpose, and which can be applied to and removed from the trailer with a minimum of effort.

Another object of the invention resides in the provision of attachment means adapted to be quickly applied without the use of special tools or skilled workmen to secure a trailer against movement relative to a flat car.

A further object of the invention resides in the provision of trailer mounting and attachment means adapted to raise and rigidly support a trailer body above a car floor to remove the load from the trailer springs and thus prevent vertical movement of the trailer body relative to the car body.

Another object of the invention resides in the provision of an attachment means embodying a support beam provided with a socket to receive and engage the trailer king pin, the ends of the beam being provided with caps to receive the upper ends of jacks employed to lift and support the front end of the trailer body.

Another object of the invention resides in the provision of a support beam provided with a socket adapted to be detachably connected to a trailer king pin by merely moving the beam relative thereto.

Another object of the invention resides in the provision of a trailer support beam having a trailer king pin receiving socket formed with flanges and shoulders adapted to engage and prevent accidental displacement of a king pin from the socket.

Another object of the invention resides in the provision of a trailer support beam provided with clevises for engagement by tie down chains.

The invention embodies other novel features, details of construction and arrangement of parts which are hereinafter set forth in the specification and illustrated in the accompanying drawings, wherein:

Figure 1 is a top plan view illustrating a highway trailer detachably secured on a flat car by fastening means embodying features of the invention;

Figure 2 is a side elevational view of same;

Figure 3 is a top plan view illustrating the support beam provided for detachable engagement with a trailer king pin, only one-half of the beam being shown as it is symmetrical about its transverse center line;

Figure 4 is a rear elevational view of same;

Figure 5 is a transverse sectional view taken along the line 5—5 of Figure 4, illustrating the support beam as applied to the underside of a trailer body with the king pin disposed within the socket provided in the beam;

Figure 6 is a transverse sectional view, corresponding to Figure 5, illustrating the support beam as suspended from the king pin during mounting or removal of the beam with respect to the king pin, and Figure 7 is a fragmentary sectional view taken along the line 7—7 of Figure 6.

Referring now to the drawings for a better understanding of the invention, a conventional highway trailer 2 is shown as mounted upon a railway flat car 4 having steel side rails 6—6 bolted or otherwise secured to the floor 8 and/or the car frame 9. The highway trailer is shown as comprising the usual body 10 adapted to be supported upon rear wheels 12 and a suitable landing gear 14. A king pin 16 projects downwardly from the forward end of the trailer body 10 for detachable engagement by a conventional fifth wheel of a highway trailer tractor.

The highway trailer 2 is engaged against movement relative to the flat car by means including sets of chock blocks 18—18 mounted on the car floor 8 and interconnected by suitable tie rods (not shown) to engage front and rear sides of the wheels 12, the chock blocks being secured against movement along the floor by means of nails or the like. Tie down chains 20—20 and 22—22 are connected by any suitable means to the back end of the trailer body 10, the chains 20—20 extending rearwardly and downwardly for attachment to the car floor 8, while the tie chains 22—22 diverge downwardly and rearwardly for attachment to their respective side rails 6—6. A pair of jacks J are provided to raise the back end of the trailer body 10 away from the car floor to reduce the load on the trailer springs and to prevent vertical oscillatory movement of the trailer body relative to the floor of the flat car during movement of the latter along a rough track section.

The front end of the trailer body 10 is supported by a beam structure 24 mounted at its ends upon a pair of jacks J to remove the weight of the trailer from the landing gear 14. The beam structure is shown as comprising a cast steel beam 28 of generally H section having upper and lower flanges 30 and 32 interconnected by a center web 34. The upper medial portion of the beam is formed with an elongated socket 36 to receive the trailer king pin 16, the socket extending downwardly through the upper flange 30 and being defined by an annular side wall 37 and a bottom wall 38.

As illustrated in Figure 5, the bottom wall 38 merges with the center web 34 and extends forwardly therefrom to merge with the lower end of the side wall 37. The rearward portion of the side wall 37 has its lower end provided with a retaining flange 39 which is generally U-shaped as viewed in top plan (see Figure 3) to provide parallel side portions 41—41 joined by a semicircular portion 42 for engagement within an annular recess 43 provided between the body 44 and head 46 of the trailer king pin 16.

Opposed locking recesses 47—47 are formed on the retaining flange 39 to receive diametrically opposed portions of the king pin head 46, as illustrated in Figures 6 and 7, whereby the beam 28 is adapted to be supported by and locked onto the king pin. The locking recesses 47—47 have coplanar downwardly facing support shoulders 48—48 which are inclined upwardly toward the front side of the beam, the shoulders merging with opposed arcuate surfaces 49—49 and coacting therewith to engage peripheral portions of the king pin head 46 when the beam 28 is suspended thereon in an inclined plane, as illustrated in Figure 6.

Webs 51—51 project forwardly from the central web 34 and are each formed with an aperture 52 to receive a pin 53 of a clevis 54. Webs 56—56 diverge forwardly and outboardly from opposite ends of the central web 34 and are each formed with an aperture 57 to receive a pin 58 of a clevis 59. As illustrated in Figures 1 and 2, tie down chains 98—98 and 99—99 are adapted to be connected to the clevises 54—54 and 59—59, respectively, the chains 98—98 extending downwardly for attachment to the car floor 8, and the chains 99—99 extending downwardly and outboardly for attachment to their respective side rails 6—6.

Caps 61—61 are provided at opposite ends of the beam 28 to serve as seats to receive the upper ends of jacks J, each cap comprising a top wall 62 and a depending annular side wall 63. The caps merge with and depend from the central web 34 and also merge with the ends of the lower flange 32. Each cap 61 is reinforced by a rib 64 projecting rearwardly from the central web 34 and downwardly from the upper flange 30.

Wood facings 66—66 are secured against the upper surface of the upper flange 30 by means of bolts 67, the facings projecting upwardly above the upper end of the socket side wall 37 for abutting engagement against the underside of the trailer body 10.

To mount the beam 28 upon the king pin 16, the beam is first raised vertically to position the king pin within the forward end of the elongated socket 36; after which, the beam is moved forwardly to dispose the retaining flange 39 within the king pin recess 43. The beam is then lowered to engage the king pin head 46 within the opposed locking recesses 47—47, as illustrated in Figure 6, whereby the beam is supported for rotational movement upon the king pin.

To remove the beam 28 from the king pin 16, the front side of the beam is raised to cause the kingpin head 46 to move out of the locking recesses. The beam is then moved rearwardly until the head 46 is disengaged from the locking flange 39 to permit the beam to fall by gravity from the king pin.

To secure a highway trailer in fixed position upon a railway flat car, the rear wheels 12 are engaged between chock blocks 18 and the rear end of the trailer body 10 is raised a short distance by jacks J to remove some of the trailer weight from the rear springs and to prevent movement of the trailer body toward the car floor during movement of the car over rough track sections.

After the rear end of the trailer body 10 is connected to the car by the rear tie down chains 20 and 22, the beam 28 is mounted on the king pin 16 to engage the head 46 in the opposed locking recesses 47—47. The front end of the trailer body 10 is then supported by means of jacks J engaged between the car floor and the support beam caps 61—61, and the front tie down chains 98 and 99 are connected to the clevises 54 and 59 and to the car floor and side rails, respectively.

From the foregoing it will be seen that the trailer can be secured in place on the railway car without in any way altering the trailer or adapting it specially for this purpose. The beam is fitted in place on the king pin by a simple manipulation, and the jacks are brought into supporting position and the tie down chains connected by similarly simple manipulations. The beam is adapted to use with conventional jacks and chains. Thus the beam, which is a simple device, constitutes the sole means specially made for securing the trailer.

We claim:

1. An independent detachable beam for use in supporting on a railway flat car a highway trailer having a depending king pin with a head adjacent its lower end, said beam being elongated and having intermediate its ends an opening large enough to receive the king pin head and extending vertically therethrough to define a king pin receiving socket elongated in a direction transversely of the beam and having an uninterrupted periphery which will permit entry of the king pin only by its vertical movement into the socket, said beam presenting within said socket at one end thereof an integral retaining flange projecting into the socket for engagement with the king pin head upon the lateral movement of the beam relative to the king pin after the vertical entry of the king pin into the socket to retain the king pin within the socket and to permit the beam to be suspended from the king pin during application of the beam to the trailer and to limit upward movement of the trailer from the beam after application of the beam.

2. An independent detachable beam, according to claim 1, and including recess means in the underside of said flange for receiving and retaining an upper portion of said king pin head when the beam is suspended from said king pin during application of the beam to the trailer.

3. An independent detachable beam, according to claim 2, wherein said recess means present at least one downwardly facing surface in the underside of said flange engageable with an upwardly facing surface of the king pin, and wherein said recess surface slopes upwardly of the beam toward the end of the socket remote from the flange so that the force of gravity will retain said king pin head in said recess when the beam is suspended from the king pin during application of the beam to the trailer.

4. An independent detachable beam for use in supporting on a railway flat car a highway trailer having a depending king pin with a head on its lower end, said beam being elongated and having intermediate its ends an opening extending vertically therethrough large enough to receive the king pin head to define a king pin receiving socket elongated in a direction transversely of the beam and having an uninterrupted periphery which will permit entry of the king pin only by its vertical movement into the socket, said beam presenting an integral flange projecting into the socket for engagement with the king pin head upon the lateral movement of the beam relative to the trailer after vertical movement of the king pin into the socket to support the beam from the trailer king pin during application of the beam to the trailer and to limit relative vertical movement between the beam and trailer after application of the beam to the trailer, said flange presenting a recess in the underside thereof for receiving an upper portion of the king pin head during application of the beam to the trailer.

5. An independent detachable beam for use in supporting on a railway flat car a highway trailer having a depending king pin with a head on its lower end, said beam being elongated and having intermediate its ends an opening large enough to receive the king pin extending vertically therethrough to define a king pin receiving socket elongated in a direction transversely of the beam and having an uninterrupted periphery which will permit entry of the king pin only by its vertical movement into the socket, said beam presenting within the socket at one end thereof an integral horizontal flange projecting into the socket and defining a U-shaped slot open toward the other end of the socket and of a size smaller than the diameter of the king pin head but large enough to permit entry of a portion of the king pin disposed above the head upon the lateral movement of the beam relative to the trailer after vertical movement of the king pin into the socket, said flange being engageable with the king pin head to support the beam from the trailer king pin during application of the beam to the trailer and to limit the upward movement of the trailer, said flange having in its underside a recess for receiving an upper portion of the king pin head while the beam is being supported by the king pin, said recess being deeper toward said other end of the socket so that said portion will be retained in said recess by force of gravity while the beam is being supported by the king pin head.

References Cited in the file of this patent

UNITED STATES PATENTS

| | | |
|---|---|---|
| 1,664,224 | Pinckney | Mar. 27, 1928 |
| 1,769,688 | Haseltine | July 1, 1930 |
| 2,036,344 | Menhall | Apr. 7, 1936 |
| 2,099,288 | Allen | Nov. 16, 1937 |
| 2,159,479 | Goodwin et al. | May 23, 1939 |
| 2,305,444 | Pond | Dec. 15, 1942 |